United States Patent Office 3,444,205
Patented May 13, 1969

3,444,205
PROCESS FOR PREPARING CONTINUOUSLY HIGHER MOLECULAR SECONDARY AND TERTIARY AMINES
Walter Frohlich, Burgkirchen, Germany, Hans Oberrauch, Flix, Tarragona, Spain, and Kurt Fischer, Munich, Germany, assignors to Farbwerke Hoechst Aktiengesellschaft vormals Meister Lucius & Bruning, Frankfurt am Main, Germany, a corporation of Germany
No Drawing. Filed Dec. 7, 1966, Ser. No. 599,740
Claims priority, application Germany, Dec. 10, 1965, F 47,884
Int. Cl. C07c 87/24, 87/127, 85/02
U.S. Cl. 260—583        3 Claims

ABSTRACT OF THE DISCLOSURE

Continuous preparation of higher molecular amines by reacting nitriles of 8–22 carbon atoms with low boiling primary or secondary alkylamines in a molar ratio of about 1:3 to 1:10 in the presence of hydrogen and a catalytic amount of alkalized copper-chromium catalyst at about 120–180° C. and 180–210 atmospheres.

---

The classical method of alkylating amines with alkyl halides according to A. W. Hofmann always results in mixtures of secondary and tertiary amines besides the quaternary ammonium halides. The separation of the various substituted amines is extremely complicated, besides, there exists the danger of corrosion for the apparatus when the halogen alkyls are used.

For the preparation of dimethylated higher molecular amines the method according to Leuckart-Wallach (Houben-Weyl 11/1, page 648) can be applied in which the amines are reacted with formaldehyde and formic acid. This process is rather complicated and uneconomical. The formic acid to be used in excess which serves as reducing agent for the Schiff's base and which forms in an intermediary phase, has corrosive action and has to be neutralized by means of alkali. The preceding preparation of the Schiff's base by using higher molecular amines and paraformaldehyde and subsequent hydrogenation by means of a catalyst is likewise uneconomical, as two working processes are necessary and only dark reaction products are obtained, having a distillation yield of 60 to 70%, as tests have shown.

In contrasts to this, the hitherto known catalytic processes show a homogeneous course of the reaction which leads to defined products. Thus, according to German Patent No. 637,731 higher molecular alcohols of more than 8 carbon atoms are reacted at about 350° C. at more than 50 atmospheres gauge pressure with primary or secondary amines containing up to 5 carbon atoms in the presence of catalysts splitting off water (pieces of alumina gel). In this process only yields up to 90% are obtained. Furthermore it is disadvantageous that, when working up the alkylated higher molecular amines considerable costs for distillation occur on account of the considerable excesses at the low molecular amines, used for carrying out the reaction. (Proportion by weight alcohol:amine is 1:8). Besides, the remaining content of 10% of higher molecular alcohols in the final product which have not reacted, can be separated from the amines obtained in a rather complicated way.

Adversely, higher molecular alkyl or dialkyl amines are reacted with methanol in continuous current or countercurrent to form tertiary methylalkyl amines according to German Patents No. 951,368 and 1,021,855. Working is carried out at 80 atmospheres gauge pressure at 200° to 300° C. in the presence of catalysts splitting off water and yields of more than 90% are obtained. By only preparing tertiary methyl alkyl amines the process is partially limited. A larger field of application can be guaranteed by working as follows.

According to the process of Germany Patent No. 637,431 higher molecular aliphatic nitriles are reacted under hydrogenation conditions with easily volatile aliphatic amines. When working in an autoclave preferably primary or secondary and tertiary fatty amines are obtained depending on the nature of the catalyst used. A trickling process carried out continuously by using zinc chromate as catalyst, leads to an inhomogeneous mixture of substituted fatty amines at a reaction temperature of 275° C. There are no indications as to the yield and reaction when working continuously.

Subject matter of the present invention is a process for preparing continuously straight-chained, higher molecular, saturated as well as unsaturated amines by reacting nitriles of fatty acids of 8 to 22 carbon atoms with low boiling primary and secondary amines in a molar ratio of 1:3 to 1:10 in the presence of hydrogen and a catalyst in which the nitrile-amine-mixture together with the hydrogen is passed over an alkalized copper-chromium-catalyst at 120° to 180° C., preferably at 140° to 160° C. and at 180 to 210 atmospheres gauge pressure.

The advantage of the process of the present invention lies in the fact that homogeneous secondary or teritary alkyl fatty amines are obtained in large yields (over 90%) and in high purity.

The degree of alkylation depends largely on the nature of the catalyst used. When using a nickel-silicia gel catalyst under most favorable reaction conditions, alkylation reaches only 85%, referred to the amount of fatty acid nitrile used. As undesired by-product mainly primary fatty amine and small amounts of higher molecular compounds are obtained. As opposed to this, alkylation can be increased to reach 96% of fatty acid nitrile used when, instead of the active nickel contact, a more weakly hydrogenating copper contact is used. The formation of the above-mentioned by-products can be reduced to 4%. Another advantage of the copper contact is, that, when for the alkylation, unsaturated fatty acid nitriles, for example tallow fatty acid nitrile or soybean fatty acid nitrile, are used, the iodine number changes only slightly, i.e. the double bond is practically maintained. The reaction temperature which is necessary depends on the nature of the nitrile used but lies, however, at least 100° C. below the value described for the trickling process in German Patent No. 637,431. The lower temperature has favourable effects to the homogeneity of the final products as the danger of disproportionation of the low alkyl amines used can be diminished. The alkylation of unsaturated nitriles can be carried out easier than that of saturated nitriles. The tendency to form hydrocarbon is, on account of the lower temperatures used, rather slight under the conditions of the process.

A further characteristic of the invention lies in the fact that the portion of ammonia which is obtained by reaction of alkyl nitrile with alkyl amine or dialkyl amine, is separated completely or partially, preferably by distillation, from the alkyl or dialkyl amine which is circulated during the process, in order to obtain, a highest possible content of alkyl amine in the reaction part.

The catalyst used is a fixed bed contact consisting favourably of 25 parts by weight of copper, 0.8 percent by weight of chromium and 1 percent by weight of alkali metal, in particular sodium and potassium. As carrier a kiesel gel having large pores and an active surface of 250 to 350 m.²/g. is used. The various kinds of kiesel gels given above which have wide pores have extremely favourable effects on the optimum durability of the catalysts prepared with them. The ratio of copper to chromium to alkali in the used catalyst may amount to 20 ot 30% of copper, 0.5 to 3% of chromium and 0.5 to 1.5% of alkali metal, preferably potassium or sodium.

The preparation of the catalyst is carried out according to known methods. The soaking of the carrier can be carried out with a solution of water-insoluble thermally decomposable compounds of copper, chromium and of an alkali metal. After drying as usual, a thorough roasting at 450° C. is effected to obtain metal oxides. It is likewise possible to pass the metal salts in form of complex compounds on the carrier. The salts are dissolved in concentrated ammonia water and the kiesel gel is soaked with the contact solution so many times until the composition of the desired catalyst is obtained.

Aliphatic, saturated as well as unsaturated natural or synthetic fatty acid nitriles or fatty acid nitrile mixtures of 8 to 22 carbon atoms are suitable for the process. As amines primary and secondary amines with alkyl groups of 1 to 5 carbon atoms can be used, for example methyl amine, dimethyl amine, ethyl amine, diethylamine etc.

The following examples serve to illustrate the invention but they are not intended to limit it thereto.

Example 1

19.2 kg. of coconitrile and 14.5 kg. of dimethylamine are trickled hourly at a temperature of 150° C. at a hydrogen pressure of 200 atmospheres gauge pressure in the presence of 50 m.$^3$ of hydrogen (measured without pressure) on 80 liters of a catalyst prepared and reduced as described above. The reaction mixture running out of a converter is separated in a device for degassing by pressure from the ammonia which has formed during the reaction and from the dimethyl amine in excess. By subsequent distillation by pressure the ammonia and the dimethyl amine is submitted to fractional distillation and the dimethyl amine is added again to the reaction. The durability of the contact amounts to more than 2 months. The dimethylcocoamine is formed having a yield of 95%.

Example 2

16 kg. of laurylnitrile and 8.2 kg. of methylamine are trickled hourly at a temperature of 150° C. at a hydrogen pressure of 200 atmospheres gauge pressure in the presence of 50 m.$^3$ of hydrogen (measured without pressure) on 80 liters of a catalyst prepared and reduced as described above. The reaction mixture running out of a converter is separated in a device for degassing by pressure from ammonia which has formed during the reaction and from the methyl-amine in excess. By subsequent distillation by pressure ammonia and the methyl amine are submitted to fractional distillation and the methyl amine is added again to the reaction. The durability of the contact amounts of more than 2 months. The methyl-laurylamine is formed, having a yield of 94%.

Example 3

200 g. of tallow fatty acid nitrile and 210 g. of dimethyl amine are trickled hourly at 200 atmospheres gauge pressure in the presence of 250 liters of hydrogen (measured without pressure) on 1.9 liter of a catalyst prepared as described above and heated to 145° C. The reaction mixture running out of a high-pressure furnace and consisting of dimethylated fatty amine, ammonia and dimethyl amine is allowed to expand in a separator without pressure which can be heated. The yield of dimethyl tallow fatty amine amounts to 94 to 96%. The iodine number lies at 46. In continuous operation the catalyst maintains its full action for 8 weeks.

Example 4

200 g. of stearyl nitrile and 250 g. of methyl amine are trickled hourly at 200 atmospheres gauge pressure in the presence of 250 liters of hydrogen (measured without pressure) on 1900 ml. of a catalyst prepared as described above and heated to 150° C. The methyl stearyl amine is obtained in a yield of 96%. Here, too, the contact has a durability of 2 months.

Example 5

200 g. of cetyl nitrile and 250 g. of butylamine are trickled hourly at 200 atmospheres gauge pressure in the presence of 250 liters of hydrogen (measured without pressure) on 1900 ml. of a catalyst prepared as described above and heated to 150° C. The butylcetyl amine is obtained in a yield of 93%. The contact has a durability of more than 2 months.

What we claim is:

1. A process for preparing continuously straight-chained, higher-molecular saturated or unsaturated amines comprising reacting a fatty acid nitrile having a chain length of 8 to 22 carbon atoms with a low-boiling primary or secondary alkyl amine in a molar ratio of about 1:3 to 1:10, effecting said reaction in the presence of hydrogen and an alkalized copper-chromium catalyst, wherein the nitrile-amine-mixture together with the hydrogen is passed over the alkalized copper-chromium-catalyst at about 120° to 180° C. and at a pressure of about 180 to 210 atmospheres.

2. A process as claimed in claim 1 wherein the copper-catalyst used for the hydrogenation contains 25% of copper, 0.8% of chromium and 1% of potassium on kiesel gel having large pores.

3. A process as claimed in claim 1 wherein ammonia by-product formed during the reaction is continuously separated from the slightly boiling amines in excess by distillation and the amines are recycled.

References Cited

UNITED STATES PATENTS

| | | | |
|---|---|---|---|
| 2,436,368 | 2/1948 | Weber et al. | 260—583 |
| 3,217,028 | 11/1965 | Vertnik | 260—583 |

CHARLES B. PARKER, *Primary Examiner.*

R. L. RAYMOND, *Assistant Examiner.*